United States Patent [19]

Acevedo et al.

[11] 3,919,488

[45] Nov. 11, 1975

[54] RING CONTROL CIRCUIT

[75] Inventors: Generoso Acevedo; Ashok Chadrakant Jhatakia, both of Milan, Tenn.

[73] Assignee: International Telephone and Telegraph Corporation, New York, N.Y.

[22] Filed: June 21, 1974

[21] Appl. No.: 481,507

[52] U.S. Cl. ........................ 179/18 HB; 179/18 HB

[51] Int. Cl.[2] .......................................... H04M 3/02

[58] Field of Search ......... 179/18 HB, 18 FA, 84 R, 179/84 A, 27 CB; 317/148.5 B

[56] References Cited

UNITED STATES PATENTS

| | | | |
|---|---|---|---|
| 3,045,150 | 7/1962 | Mann | 317/148.5 B |
| 3,131,318 | 4/1964 | Snyder et al. | 317/148.5 B |
| 3,445,603 | 5/1969 | Robinson | 179/18 HB |
| 3,551,754 | 12/1970 | Shaffer | 179/18 FA |

*Primary Examiner*—Thomas A. Robinson
*Attorney, Agent, or Firm*—James B. Raden; Marvin M. Chaban

[57] ABSTRACT

A circuit is disclosed for connection to a telephone line for which incoming calls are not charged and for sensing ringing current being directed toward that line to cause that line to respond and to cause the ringing to be tripped. A full wave rectifier receives applied ringing current. When the ringing current reaches a predetermined voltage, a switch is triggered to operate the normal ring trip relay and return a ring terminate signal. The operation of the circuit does not allow the battery feed relay to operate, thus the call is not registered as having been completed.

4 Claims, 1 Drawing Figure

RING CONTROL CIRCUIT

BACKGROUND OF THE INVENTION

In the telephone industry, there are occasions where it is necessary to automatically cut off ringing current to a called line, yet not have the call charged to the calling customer. For example, when a called line has been disconnected and a calling customer is to receive an interception message, the customer should not be charged; the calling customer should, however, be switched through to receive an intercept message. Also, in a fire call system where the customer is calling from a post paystation phone, no charge is made. Still further, in alarm-checking circuits where an operator dials a directory number to check for alarms in unattended offices, ringing must be sensed to complete a call terminated without any charge being made to the calling line.

The circuitry most commonly used to trip the ringing current has been a gas breakdown tube—typically, a neon bulb—which breaks down during the high voltage peaks of the ringing interval to present DC path over which the ring trip relay operates. However, the bulb may remain conducting during transfer timing and can cause the battery feed relay to operate, thereby providing a call complete signal to the call accounting network. Other configurations have been back-to-back Zener diodes and high resistance AC relays across the line. All of these arrangements have shortcomings. The gas tubes and back-to-back diodes present only an intermittent DC path to the line, and thus, may not operate slow-to-operate ring trip relays. These components may not be used in intercept circuits which have higher voltages than their breakdown characteristics allow as they would then continue to present a DC path which will simulate an answer to charge the calling customer for the call. AC relays are expensive and difficult to control and also may operate after tripping the ringing to charge the calling customer with the charge attributable to a completed call.

SUMMARY OF THE INVENTION

The present invention covers a telephone circuit which provides a full DC path to the ring trip relay. This path will sense ringing current very rapidly and cause even very slow-to-operate ring trip relays to respond. The operation of the ring trip relay is sensed, and the DC path to the ring trip relay is quickly interrupted. This speed of interruption prevents operation of the means used to charge for the call, i.e., the battery feed relay in a step-by-step system.

It is therefore an object of the present invention to provide a circuit which can be applied to lines to sense and terminate ringing in a manner which does not cause battery reversal or other indications of a completed call.

It is a further object of the invention to provide a voltage-sensitive circuit responsive to ringing current for causing the ringing to be tripped.

It is a further object of the invention to provide a circuit which responds to ringing current to terminate the ringing while preventing indications of a completed call.

BRIEF DESCRIPTION OF THE DRAWING

The single drawing shows a schematic circuit diagram of our invention.

DETAILED DESCRIPTION

Figure 1:
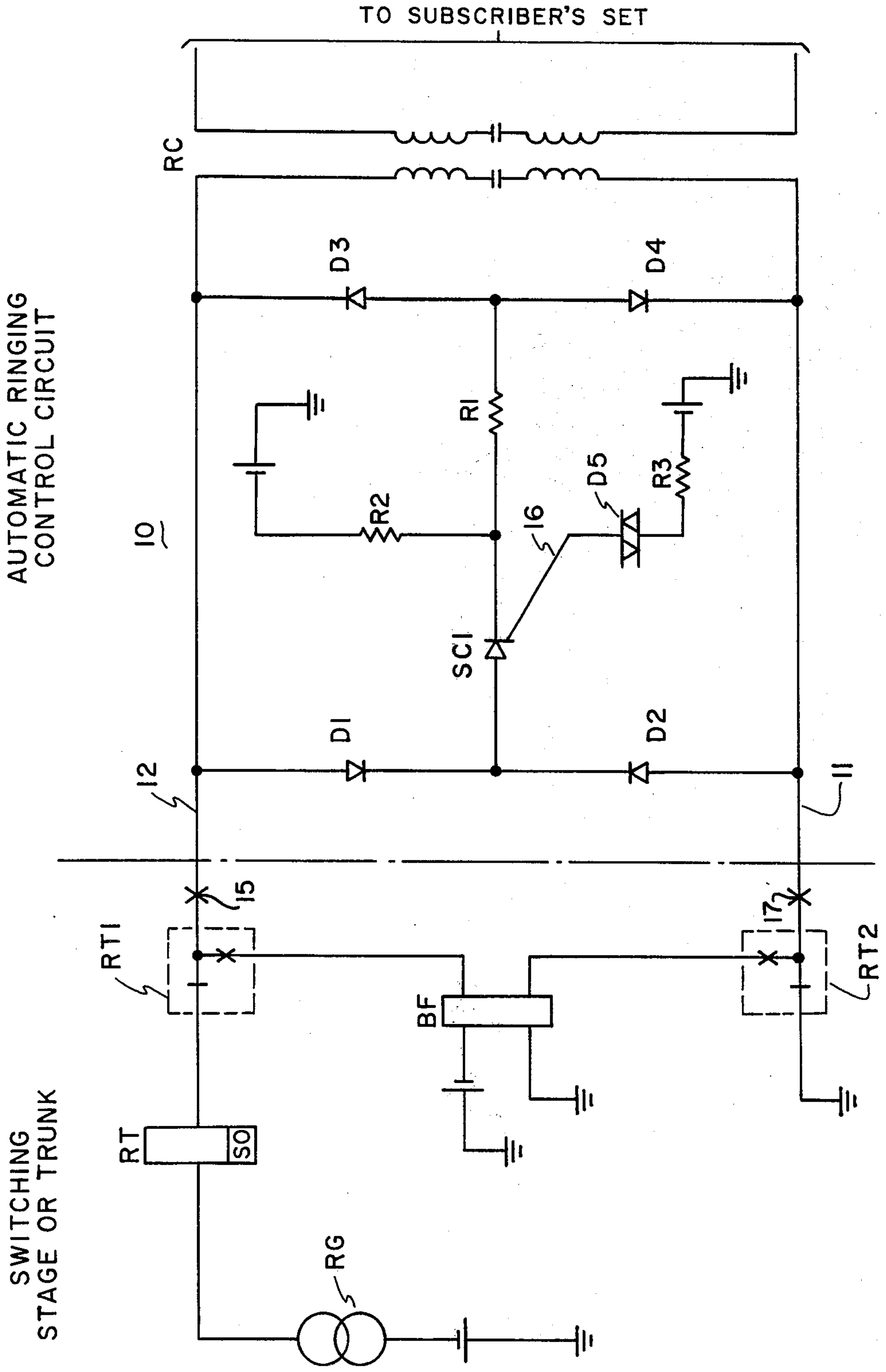

In the usual situation, ringing may be applied through a stage of a switching network such as the final or connector stage of a step-by-step system, or from a trunk to a called line. When the called line responds by closing the called line loop, a suitable relay such as a ring trip relay in the final stage is energized to open the circuit between the ringing generator and the called line. The operation of the ring trip relay closes its transfer contacts. These transfer contacts reverse the battery feed relay and operate the battery feed relay to signal that the call has been answered to initiate a charge for that call.

As indicated for the present invention, ringing is to be sensed. Sensing of ringing will cause the ring trip relay to operate but will prevent the battery feed relay from operating.

In the drawing, we show a means for performing those steps in a system which may be a step-by-step system or any similar system. We show portions of the final switching stage including two relays of any known type as employed in the connector or final stage of the system or in a trunk circuit to perform ring trip (RT relay) and reverse battery or battery feed (BF relay). The RT relay has a set of transfer contacts in the operating path to the BF relay to perform the battery reversal function on call completion. The battery reversal is sensed as the originating signal for the call control and recording of the call completion. A set of contacts 15 and 17 in the final stage or the trunk is shown to provide the connection betweeen the stage and the called line as performed by crosspoints of a crossbar switch or wipers of a step-by-step switch.

A ring control circuit such as circuit 10 is coupled between the final stage of the network and the called line in place of the ringer of other audible device.

Circuit 10 includes a full wave rectifier, comprised of diodes D1, D2, D3, and D4, within which is a switching device such as silicon controlled rectifier SC1, a voltage desensitizing network comprised of DIAC D5 and resistor R3, a ring tripping resistor R1 and a biasing resistor R2.

When a call is made to the line bearing circuit 10, leads 11 and 12 are accessed in known fashion to connect these leads through the final switching stage. By suitable known means (not shown), the ringing generator is activated to emit ringing pulses of approximately 100 volts AC. Ringing current is applied on lead 12 to the ring control circuit 10.

The full wave rectifier D1-D4 rectifies the ringing voltage supplied by the ringing generator. The DIAC D5 does not break down until the potential across it reaches approximately 20 volts, at which time it impresses a firing voltage at the SCR trigger lead 16. Rectifier SC1 will then conduct and present a DC path from the ringing generator through the ring trip relay RT, through transfer contact set RT1 of relay RT, then through control circuit 10 over a path through rectifier D1, the anode to cathode path through SCR1, diode D4 and finally to ground through transfer contact RT2. This current flow will operate typically slow-to-operate relay RT. Rectifier SC1 is maintained forward biased during excursions of the ringing voltage through zero potential by biasing resistor R2. When relay RT operates, it locks operated by means not shown. A momentary open circuit condition during the operation of relay RT when the transfer contacts operate will immediately stop conduction of the rectifier SC1 so as not to operate the battery feed relay BF. Speech currents can then pass through repeat coil RC or talking capacitors (not shown). In this way, ringing is sensed to cause the ring trip relay to operate simulating the closed loop or off-hook condition of the called line to cause the ring trip relay to operate, and prevent the battery feed relay from operating.

With the circuit shown, the relative timing between the fast turn-off of the SCR and the comparatively slow operate time of an electromechanical relay ensures that the battery feed relay will not operate during the transfer period. The turn-off time of the SCR is typically on the order of a few microseconds while the relay operate time requires milliseconds. By this great disparity in timing, the battery feed relay is prevented from operating when the circuit responds to terminate ringing.

We claim:

1. A ring trip control circuit for a telephone system in which the system has a source for transmitting AC ringing signals to a called line, a ring trip relay for disconnecting the ringing signals from the called line responsive to the called line going off-hook and answer supervision means responsive to the called line going off-hook, the ring trip control circuit comprising means for sensing ringing current applied to a predetermined called line, means responsive to sensed ringing current to said last-mentioned line for simulating an off-hook condition for completing a direct current path to the ring trip relay and thereby operate the ring trip relay to disconnect the ringing source from the ring control circuit, contacts on said ring trip relay in a completed path to said simulating means, said contacts opening said completed path on energization of said relay, said simulating means responsive to operation of said relay for preventing operation of the answer supervision means by opening a path to said answer supervision means before operation thereof.

2. A circuit as claimed in claim 1, wherein said sensing means comprises means for rectifying said ringing signals, and said simulating means including switching means responsive to rectified ringing signals for closing a direct path from a bias source to said ring trip relay, and including means for biasing said switching means in its operated state between ringing signals.

3. A circuit as claimed in claim 2, wherein said switching means comprises an SCR with switching time in the nature of microseconds and said answer supervision means comprises an electromechanical member having switching times on the order of milliseconds.

4. A ring trip control circuit for a telephone system having a source of AC ringing signals with at least one switching control circuit in said system adapted to access a called line to apply ringing signals from the source to a called line, the switching control circuit being equipped with a ring trip relay for disconnecting the ringing signals from the called line responsive to the called line going off-hook and an answer supervision relay normally operative over a closed loop through the called line responsive to an off-hook condition to signal call completion, said ring trip control circuit adapted to be coupled between a predetermined line and said switching control circuit and comprising means for rectifying the ringing current applied to said predetermined line when called, means responsive to the voltage of the rectified current signals reaching a threshold level for operating a switching member, said switching member on operation causing operation of the ring trip relay to disconnect the ringing source from the called line, a path for maintaining said switching means operated, said switching means responsive to a momentary interruption of its maintaining path during operation of said ring trip relay for opening said switching means maintaining path, said switching means included in an operating path to said answer supervision relay and responsive immediately to the opening of said switching means maintaining path to shut off for preventing operation of the answer supervision relay.

* * * * *